(12) United States Patent
Pereira et al.

(10) Patent No.: US 9,937,824 B2
(45) Date of Patent: Apr. 10, 2018

(54) VEHICLE SEAT ADJUSTMENT SYSTEM

(71) Applicant: GM GLOBAL TECHNOLOGY OPERATIONS LLC, Detroit, MI (US)

(72) Inventors: Claudemir Pereira, São Caetano do Sul (BR); Leonardo A. Piccardi, São Caetano do Sul (BR); Eduardo H. Lofrano, Santo Andre (BR); Luiz E. Carmona, São Caetano do Sul (BR)

(73) Assignee: GM Global Technology Operations LLC, Detroit, MI (US)

(*) Notice: Subject to any disclaimer, the term of this patent is extended or adjusted under 35 U.S.C. 154(b) by 78 days.

(21) Appl. No.: 15/130,240

(22) Filed: Apr. 15, 2016

(65) Prior Publication Data
US 2017/0297458 A1 Oct. 19, 2017

(51) Int. Cl.
*B60N 2/30* (2006.01)
*B60N 2/20* (2006.01)

(52) U.S. Cl.
CPC ............. *B60N 2/3011* (2013.01); *B60N 2/20* (2013.01); *B60N 2/305* (2013.01)

(58) Field of Classification Search
CPC .......... B60N 2/20; B60N 2/206; A47C 1/024; A61G 5/1067
USPC .............. 297/378.12, 378.1, 354.1, 535, 335
See application file for complete search history.

(56) References Cited

U.S. PATENT DOCUMENTS

| | | | | |
|---|---|---|---|---|
| 6,152,533 A | * | 11/2000 | Smuk | B60N 2/12 297/341 |
| 6,513,875 B1 | * | 2/2003 | Gray | B60N 2/206 297/354.12 |
| 7,380,885 B2 | * | 6/2008 | Fischer | B60N 2/20 297/362 |
| 8,439,444 B2 | * | 5/2013 | Ngiau | B60N 2/12 297/331 |
| 8,662,589 B2 | * | 3/2014 | Suzuki | B60N 2/12 297/378.12 |
| 8,985,691 B2 | * | 3/2015 | Tsuruta | B60N 2/2356 297/331 |
| 9,403,447 B2 | * | 8/2016 | Elton | B60N 2/2352 |
| 2002/0135216 A1 | * | 9/2002 | Hamelin | B60N 2/3011 297/378.12 |
| 2004/0108765 A1 | * | 6/2004 | Habedank | B60N 2/206 297/378.12 |
| 2004/0239169 A1 | * | 12/2004 | De Nichilo | B60N 2/206 297/378.12 |

(Continued)

*Primary Examiner* — Jose V Chen
(74) *Attorney, Agent, or Firm* — Quinn IP Law

(57) ABSTRACT

A seat assembly includes a seat frame having a first end connected to a vehicle and a second end cooperating with a latching system having a latching mechanism to releasably secure to at least one receiving portion. A seat structure adjustably positionable on the seat frame includes a seat bottom and a seat back pivotally connected to the seat structure. A seat adjustment system includes a first guide member proximate the latching mechanism having a first channel portion and a second guide member proximate the seat structure having a second channel portion configured to align with the first channel portion. A coupling element operatively connected to a first actuator includes an elongate projection that is translated from a locked position in the first channel portion to an unlocked position in the second channel portion to release the latching mechanism from the at least one receiving portion.

20 Claims, 6 Drawing Sheets

(56) References Cited

U.S. PATENT DOCUMENTS

| | | | |
|---|---|---|---|
| 2006/0097560 A1* | 5/2006 | Keyser | B60N 2/305 |
| | | | 297/378.12 |
| 2006/0138844 A1* | 6/2006 | LaVoie | B60N 2/01583 |
| | | | 297/378.12 |
| 2006/0152058 A1* | 7/2006 | Pejathaya | B60N 2/0232 |
| | | | 297/378.12 |
| 2007/0236067 A1* | 10/2007 | Nathan | B60N 2/0224 |
| | | | 297/378.12 |
| 2010/0176641 A1* | 7/2010 | Hayakawa | B60N 2/20 |
| | | | 297/378.12 |

* cited by examiner

VEHICLE SEAT ADJUSTMENT SYSTEM

TECHNICAL FIELD

This disclosure relates to a vehicle seat assembly and more particularly, a seat adjustment system for a vehicle seat assembly.

BACKGROUND

Vehicles may include a one or more seating areas or rows of seats that are displaceable to a number of positions to accommodate various configurations for the vehicle passenger compartment. Some vehicles, including sport utility vehicles, passenger vans and the like, may include a second row of seats positioned forward of a third row of seats in the passenger compartment. The second row of seats may be adjusted to grant access to the third row of seats through a vehicle door opening.

Vehicle seats configured for adjustment from a seating arrangement to a stored or tumbled arrangement typically include a seat back pivotally connected to a seat bottom and one or more mechanisms that secure the vehicle seat to a portion of the vehicle passenger compartment or vehicle floor. The mechanisms retain the vehicle seat in a seating arrangement until actuated by a passenger to move or collapse the seat back adjacent the seat bottom for placement in the stored arrangement.

SUMMARY

A seat assembly for use in a vehicle comprises a seat frame having a first end connected to the vehicle and a second end. A seat structure is adjustably positionable between the first and second ends of the seat frame and includes a seat bottom and a seat back pivotally connected to the seat structure. A latching system cooperates with the seat frame and includes at least one receiving portion and a latching mechanism disposed on the seat frame to releasably secure to the at least one receiving portion.

A seat adjustment system is operatively connected to the latching system to adjustably position the seat frame relative to the vehicle. The seat adjustment system includes a first guide member disposed proximate the latching mechanism and having a first channel portion, and a second guide member disposed proximate the seat structure and having a second channel portion configured to align with the first channel portion. A first actuator operatively connected to the latching mechanism releasably secures the latching mechanism to the at least one receiving portion.

A coupling element communicates with the first actuator and includes an elongate projection at least partially received within the first channel portion movable between a locked position in the first channel portion and an unlocked position in the second channel portion. The seat structure is adjustable on the seat frame to align the second channel portion on the second guide member with the first channel portion on the first guide member to move the elongate projection from the locked position to the unlocked position in the second channel portion to release the latching mechanism from the at least one receiving portion.

The seat assembly further comprises at least one indicia provided on at least one of the first guide member and second guide member to indicate when the first channel portion and the second channel portion are in alignment. It is contemplated that the at least one indicia provided on the first guide member is aligned with at least one indicia provided on the second guide member to indicate when alignment of the first channel portion and the second channel portion.

The seat structure includes at least one track mount operatively connected to at least one track channel on the seat frame to move the seat structure relative to the seat frame. A second actuator selectively engages a release mechanism cooperating with the at least one track mount to position the seat structure relative to the seat frame and aligned the first channel portion with the second channel portion. The seat assembly further comprises an adjustment mechanism for selectively adjusting the seat back relative to the seat bottom between a seated position and a folded position wherein the seat back is placed proximate the seat bottom.

The first end of the seat frame is pivotally connected to a floor of the vehicle to adjust the seat frame between a first position wherein the seat frame is positioned proximate the vehicle floor and a second position wherein the seat frame pivots about the first end. The first guide member is secured to a portion of the latching mechanism. The second guide member is secured to a portion of the seat structure.

In one embodiment of the disclosure, a seat assembly for use in a passenger compartment of a vehicle comprises a seat frame having a first end pivotally connected to the passenger compartment and a second end. A seat structure is adjustably positionable between the first and second ends of the seat frame and includes a seat bottom and a seat back pivotally connected to the seat structure. An adjustment mechanism selectively adjusts the seat back relative to the seat bottom between a seating position and a folded position wherein the seat back is placed proximate the seat bottom.

A latching system cooperates with the seat frame and includes at least one receiving portion and a latching mechanism disposed on the seat frame to releasably secure to the at least one receiving portion. A seat adjustment system is operatively connected to the latching system to adjustably position the seat frame relative to the vehicle. The seat adjustment system includes a first guide member disposed proximate the latching mechanism having a first channel portion and a second guide member disposed proximate the seat structure having a second channel portion configured to align with the first channel portion. At least one indicia is provided on at least one of the first guide member and second guide member.

A first actuator operatively connected to the latching mechanism releasably secures the latching mechanism to the at least one receiving portion. A coupling element communicates with the first actuator and includes an elongate projection at least partially received within the first channel portion movable between a locked position in the first channel portion and an unlocked position in the second channel portion. The seat structure is adjustable on the seat frame to align the second channel portion on the second guide member with the first channel portion on the first guide member to move the elongate projection from the locked position to the unlocked position in the second channel portion to release the latching mechanism from the at least one receiving portion.

The seat structure includes at least one track mount operatively connected to at least one track channel on the seat frame to move the seat structure relative to the seat frame. A second actuator selectively engages a release mechanism cooperating with the at least one track mount to position the seat structure relative to the seat frame and aligned the first channel portion with the second channel portion.

The first end of the seat frame is pivotally connected to the passenger compartment to adjust the seat frame between a first position wherein the seat frame is positioned proximate the passenger compartment and a second position wherein the seat frame pivots about the first end. The first guide member is secured to a portion of the latching mechanism. The second guide member is secured to a portion of the seat structure.

In another embodiment of the disclosure, a vehicle seat adjustment system includes a latching system having at least one receiving portion and a latching mechanism releasably secured to the at least one receiving portion. The seat adjustment system includes a first guide member having a first channel portion and a second guide member having a second channel portion configured to align with the first channel portion. At least one indicia is provided on at least one of the first guide member and second guide member.

The at least one indicia is provided on the first guide member and aligned with at least one indicia provided on the second guide member when the first channel portion is aligned with the second channel portion. A coupling element having an elongate projection at least partially received within the first channel portion is movable between a locked position in the first channel portion and an unlocked position in the second channel portion. The first guide member is secured to a portion of the latching mechanism while the second guide member is secured to a portion of a seat structure of the vehicle seat.

The above noted and other features and advantages of the present disclosure are readily apparent from the following detailed description when taken in connection with the accompanying drawings.

DETAILED DESCRIPTION

Figure 1:
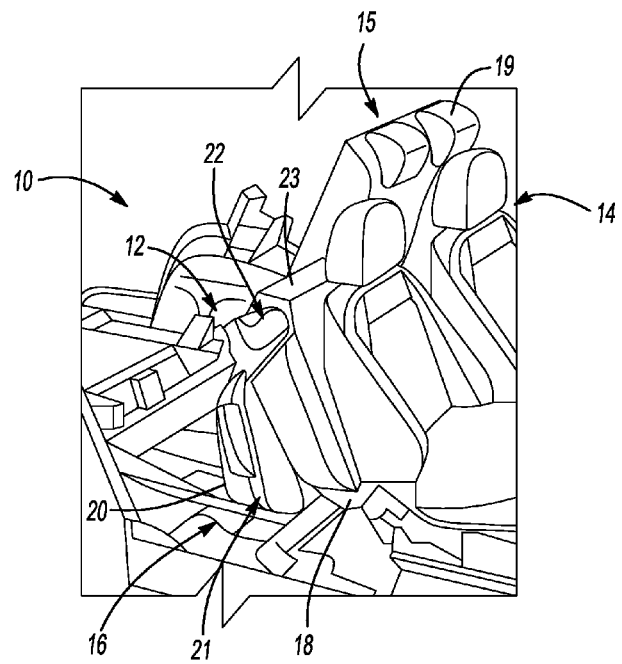
FIG. 1 is a perspective view of a portion of a passenger compartment of a vehicle having one or more rows for seating.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring to the drawings, wherein like reference numbers correspond to like or similar components throughout the several Figures, FIG. 1 shows a schematic view of a motor vehicle 10. Vehicle 10 is shown for illustrative purposes and demonstrates only one possible environment into which a passenger compartment 12 defining an interior therein. It is understood that the vehicle 10 may be any mobile platform, such as an airplane, all-terrain vehicle (ATV), boat, personal movement device, robot and the like to accomplish the purposes of this disclosure.

One or more seating rows or areas 14 are disposed within the passenger compartment 12. As is illustrated in FIG. 1, the one or more seating rows 14 includes a first row of seats 14 and a second row of seats 15 each securable to a vehicle structure or floor 16 and adjustably positioned relative to the floor 16 in the passenger compartment 12. The second row seats 15 may be second or third row of seats in a sport utility vehicle or the like. The floor 16 may include a floor covering or upholstery, such as carpet or the like, to match with the interior of the vehicle 10.

Figure 2:
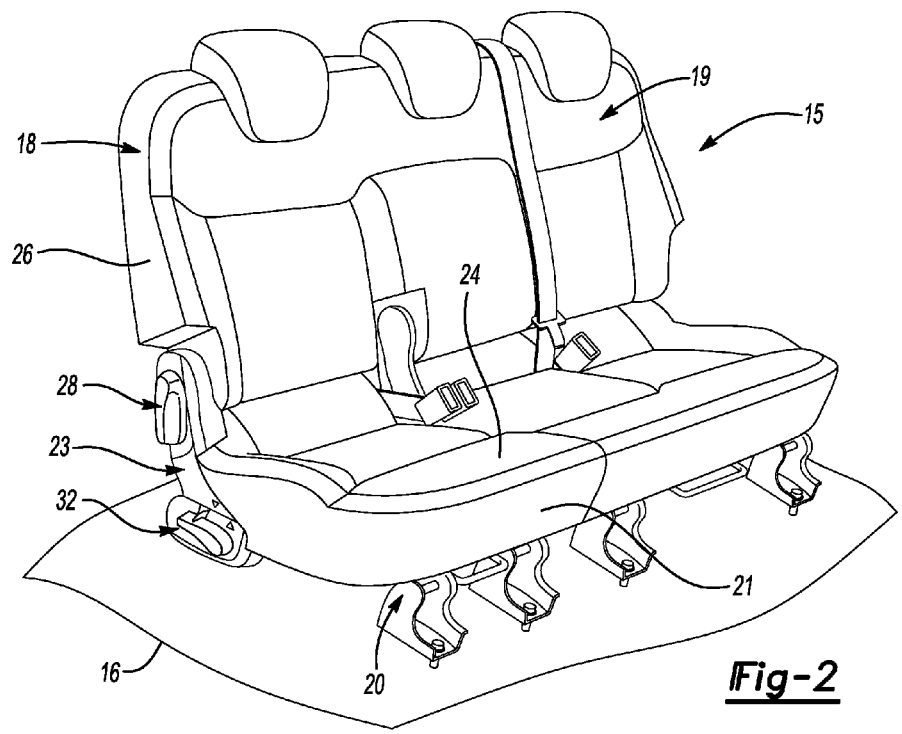
FIG. 2 is a perspective view of a row of seats illustrated in the vehicle passenger compartment shown in a first folding position.

Referring additionally to FIG. 2, the second row of seats 15 may include a first seat assembly 18 and a corresponding second seat assembly 19 arranged adjacent to the first seat portion 18. The first and second seat assembly 18, 19 may be connected to one another. It is understood that both the first and second seat assembly 18, 19 of the second row of seats 15 or only one first and second seat assembly 18, 19 are foldable and positionable in accordance with the embodiments of the disclosure.

It is contemplated that the division of the second row of seats 15 may correspond to a ratio of 60:40 wherein the first seat assembly 18 accounts for forty percent of the second row of seats 15 while the second seat assembly 19 accounts for the remaining sixty percent of the second row of seats 15. Alternatively, the second row of seats 15 may use a different ratio for the first and second seat assembly 18, 19, or, may provide a unitary seating arrangement wherein the second row of seats 15 includes a single elongate first seat assembly 18.

Similar reference numbers will be used to describe similar features for multiple seating components. The first seat assembly 18 and second seat assembly 19 each include a seat frame 20 having a first end 21 securable to the vehicle 10. As shown in the Figures, the first end 21 of the seat frame 20 is secured to a floor 16 of the passenger compartment 12 The seat frame further includes an opposing second end 22 from the first end 21 and a seat structure 23 adjustably positionable on the seat frame 20 between the first and second ends 21, 22 of the seat frame 20.

Seat structure 23 includes a seat bottom 24 and a seat back or backrest 26. The seat bottom 24 extends from the seat structure 23 and generally planar to the seat frame 20. The seat back 26 extends from and is pivotally connected to the seat structure 23. At least one adjustment mechanism 28 couples the seat back 26 to the seat structure 23 such that the seat back 26 is selectively adjustable between at least a seating and a folding position relative to the seat bottom 24 as will be described in greater detail below.

As is shown in FIGS. 2, 3, 6 and 7, the first seat assembly 18 may be adjustable between one or more positions relative to the second seat assembly 19. It is contemplated that both the first seat assembly 18 and second seat assembly 19 may be adjustable as described herein or only one of the first or second seat assembly 18, 19 may be adjusted to accomplish the objectives of the disclosure.

For purposes of clarity, the first seat assembly 18 will be referred to as seat 18. The seat 18 may be placed in a seated or deployed position, as illustrated in FIG. 2, wherein the seat back 26 extends upward from the seat structure 23 and relative to the seat bottom 24 and may be adjusted to one or more generally upright positions relative to the seat bottom 24. In one embodiment of the disclosure, the seat 18 may be moved from the seated or deployed position to a folded position shown in FIGS. 3 and 7.

A handle 30 may be disposed on or adjacent to the seat 18 that cooperates with the adjustment mechanism 28. The handle 30 cooperates with a lever or the like (not shown) to operatively connect the handle 30 with the adjustment mechanism 28 to pivot the seat back 26 about the adjustment mechanism 28 relative to the seat bottom 24 between the first or seated position to the folded position to position the seat back 26 proximate to or in contact with the seat bottom 24. The folded position of the seat 18 may provide a large entry opening in the passenger compartment 12 of the vehicle 10 while granting access to the second seat assembly 19.

A latching system for use with the seat 18 is described in greater detail. The latching system includes latching mechanism 32 disposed on the second end 22 of the seat frame 20 and proximate the seat structure 23. Latching mechanism 32 may be configured to releasably engage at least one receiving portion 36 to secure the seat 18 in a position adjacent the vehicle floor 16. The at least one receiving portion 36 may be provided on the floor 16 of the passenger compartment 12 or may be incorporated in a portion of the seat frame 20. A seat adjustment system 38 is operatively connected with the latching mechanism 32 of the latching system to selectively secure the latching mechanism 32 to the at least one receiving portion 36 to adjustably position the seat frame 20 relative to the floor 16 of the passenger compartment of the vehicle.

Figure 7:
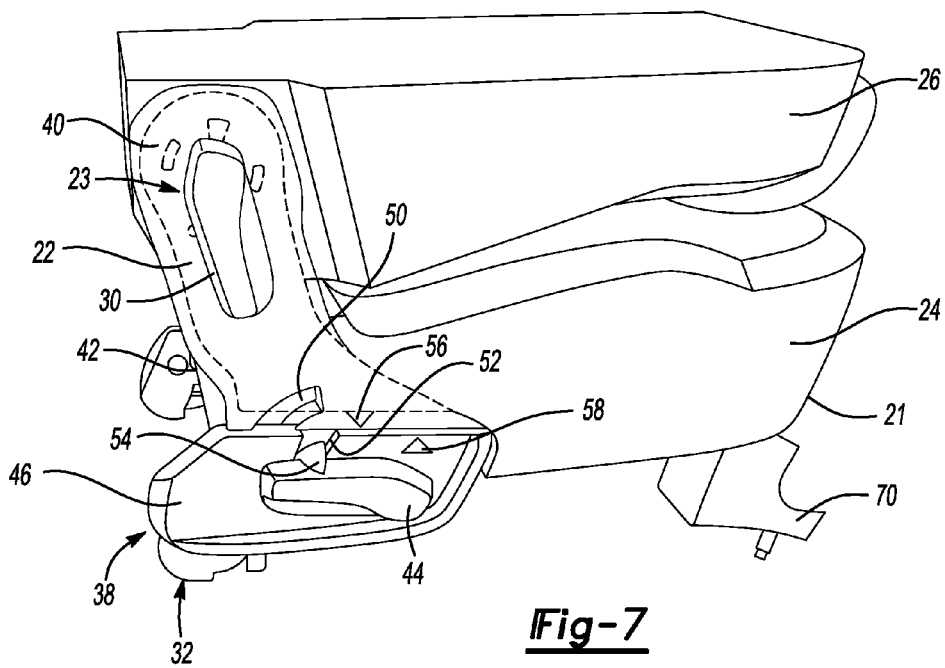
FIG. 7 is a side plan view of the first seat assembly shown in the second folded position.
Figure 8A:
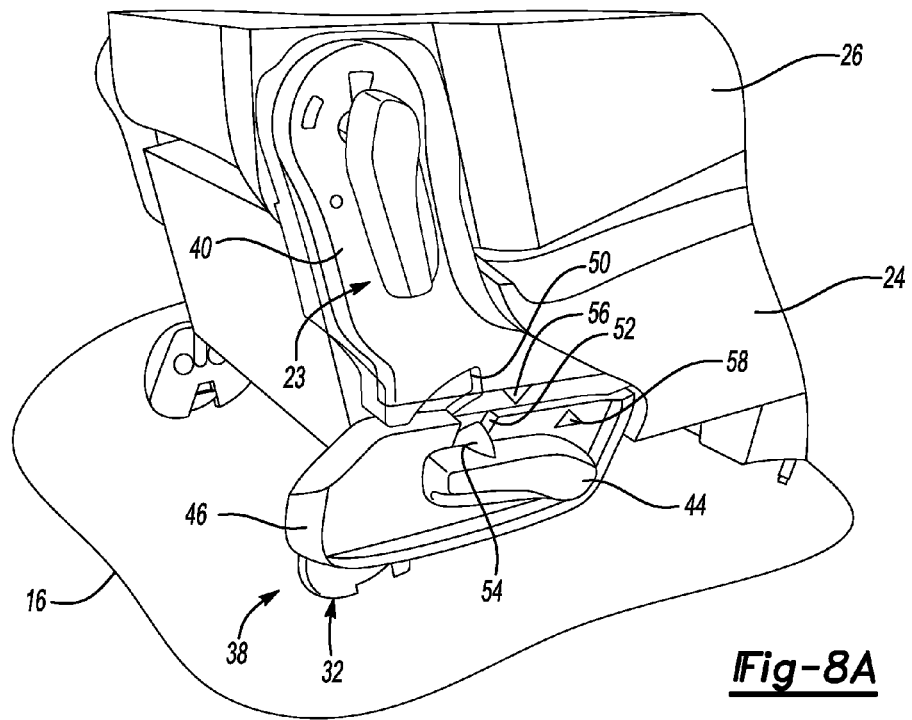
FIGS. 8A-8D illustrate a latching system having at least a first actuator and a second actuator cooperating with the first seat assembly to move the first seat assembly between the first, second and third folding positions in accordance with the embodiments of the disclosure.

Referring now to FIGS. 7 and 8A-8D, the seat adjustment system, generally referenced by numeral 38, for positioning the seat structure 23 between at least one of an unlocked position and a locked position is described in greater detail. As is shown in FIGS. 7 and 8A, a first guide member 40 is disposed proximate to the seat structure 23 to at least partially enclose an outer periphery of the seat structure 23. The first guide member 40 may be formed of a variety of materials with a variety of finishes to integrate the first guide member 40 with the appearance of the seat bottom 24 and seat back 26.

A first actuator 42 cooperates with the latching mechanism 32 and includes a coupling element 44 disposed adjacent a second guide member 46. The first actuator 42 is operatively connected with the latching mechanism 32 to releasably secure the latching mechanism 32 to the at least one receiving portion 36. It is appreciated that the first actuator 42 may comprise mechanical, electrical and/or electromechanical actuating units to selectively latch and unlatch the latching mechanism 32. The second guide member 46 may be disposed on or adjacent to the latching mechanism 32 to at least partially enclose the outer periphery of the latching mechanism 32.

The terms first guide member 40 and second guide member 46 are used for reference purposes only. It is understood that the first guide member 40 may be a member securable adjacent the seat structure 23 or may be integrally formed as part of the seat structure 23. Further, the second guide member 46 may be a member securable adjacent the latching mechanism 32 or may be integrally formed as part of the latching mechanism 32 to accomplish the objectives of the disclosure.

A channel 48 including a first channel portion 50 is provided in the first guide member 40 while a second channel portion 52 of channel 48 is provided in the second guide member 46. First and second channel portions 50, 52 at least partially receive and cooperate with coupling element 44 of the first actuator 42. The channel 48 may be at least partially formed into each of the first guide member 40 and the second guide member 46 with a variety of geometries to accommodate movement of an elongate projection 54 provided on or extending from the coupling element 44 of the first actuator 42 therethrough.

Figure 3:
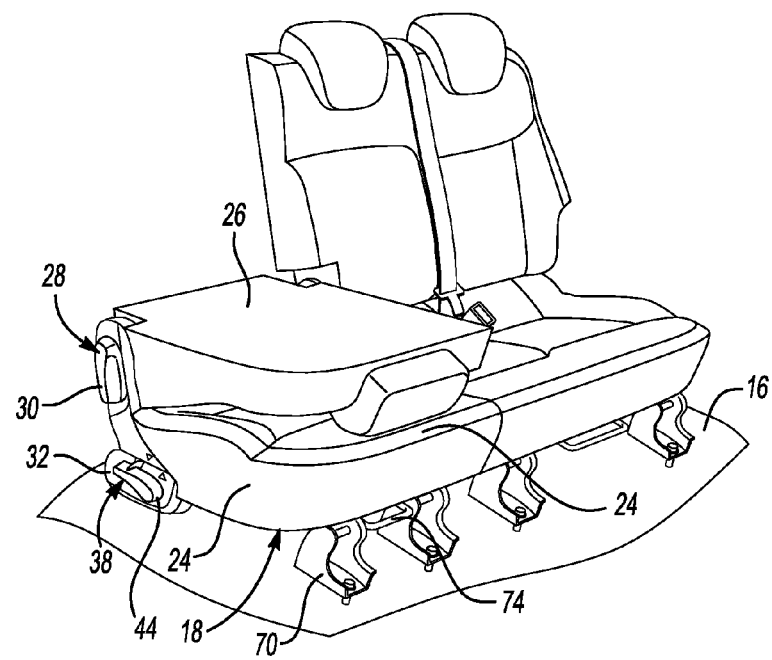
FIG. 3 is a perspective view of the row of seats including a first seat assembly shown in a second folding position adjacent a second seat assembly.
Figure 5:
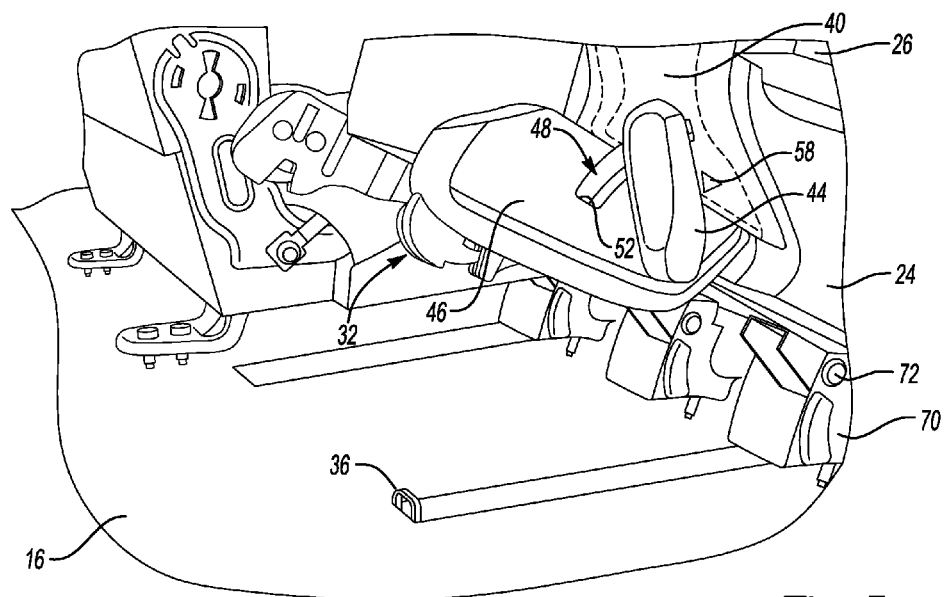
FIG. 5 is a rear perspective view of a latching mechanism incorporated in a seat bottom of the first seat assembly.
Figure 6:
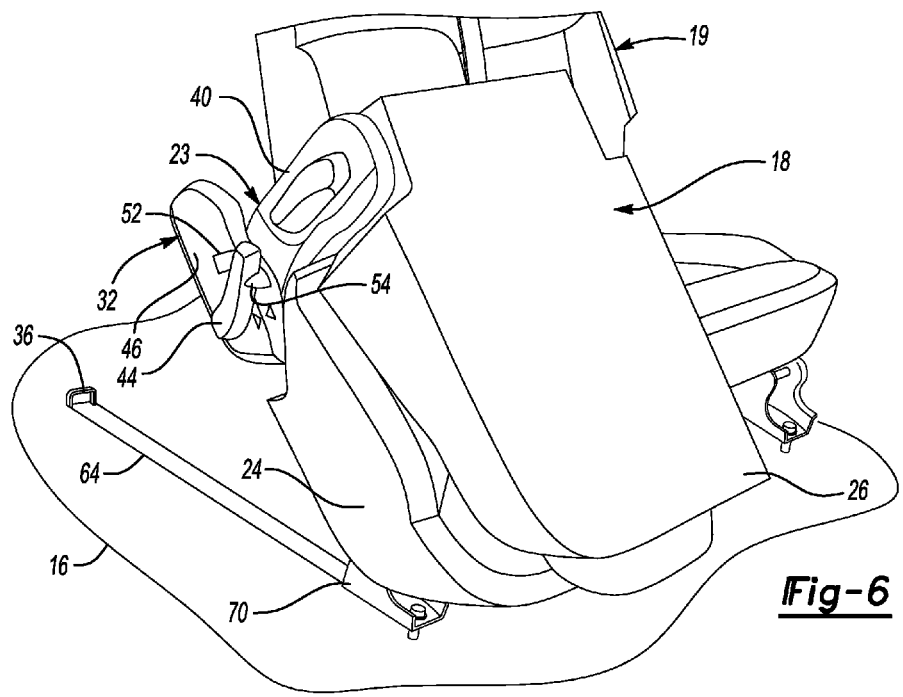
FIG. 6 is a perspective view of the row of seats having the first seat assembly shown in the third folding position adjacent a second seat assembly.

As shown in the Figures, channel 48 is generally arcuate in shape having a first channel portion 50 provided in the first guide member 40 and a second channel portion 52 provided in the second guide member 46. Coupling element 44 is operatively connected to the latching mechanism 32 through the first actuator 42. Actuation of the coupling element 44 causes first actuator 42 disengage the latching mechanism 32 from at least one receiving portion 36 of the latching system. When the latching mechanism 32 disengages the at least one receiving portion 36, the seat bottom 24 and seat back 26 may be adjusted from the first folded position as illustrated in FIGS. 3 and 7 wherein the seat frame 20 is positioned proximate to the passenger compartment floor 16 of the vehicle to a second folded position as represented in FIGS. 5 and 6 wherein the seat frame 20 pivots about the first end 21 of the seat frame 20.

In one embodiment of the disclosure, the seat structure 23 is adjusted on the seat frame 20 to align the second channel portion 52 on the second guide member 46 with the first channel portion 50 on the first guide member 40 to move the elongate projection 54 from a locked position in the first channel portion 50 to the unlocked position in the second channel portion 52 to release the latching mechanism 32 from the at least one receiving portion 36 of the latching system. The elongate projection 54 extending from coupling element 44 of the first actuator 42 is configured to at least partially translate within and move through the second channel portion 52 in the second guide member 46 on the latching mechanism 32 into the first channel portion 50 in the first guide member 40 on the seat structure 23 as the coupling element 44 is actuated when the first and second channel portions 50, 52 of channel 48 are aligned.

Referring now to FIGS. 8A-8D, the seat adjustment system 38 is used to adjust the position of the seat 18 between the first position and the second position is illustrated. It is contemplated that the seat back 26 may be adjusted from the seated position, wherein the seat back 26 extends generally upward relative to the seat bottom 24, to the folded position, wherein the seat back 26 is place proximate to the seat bottom 24, prior to actuation of the seat adjustment system 38 prior to the seat being placed in the second position. However, it is understood that the seat adjustment system 38 may be incorporated in a seat assembly wherein the seat is moved from the first position to the second position without movement of the seat back 26 to the folded position placing seat back 26 proximate to the seat bottom 24.

As is shown in FIG. 8A, the coupling element 44 of the first actuator 42 cooperating with the latching mechanism 32 is shown in a first or non-actuated position. In this first position, the latching mechanism 32 engages the at least one receiving portion 36 to secure the seat frame 20 of seat 18 adjacent the floor 16 of the passenger compartment 12. The first channel portion 50 of the channel 48 on the first guide member 40 on seat structure 23 is not aligned with the second channel portion 52 of the channel 48 on the second guide member 46 on the latching mechanism 32. The elongate projection 54 of the coupling element 44 of the first actuator 42 is placed in a locked position wherein the projection 54 extends into the second channel portion 52 of the channel 48 but cannot translate into the first channel portion 50 on the first guide member 40. As a result, the latching mechanism 32 remains secured to the at least one receiving portion 36.

Figure 8B:
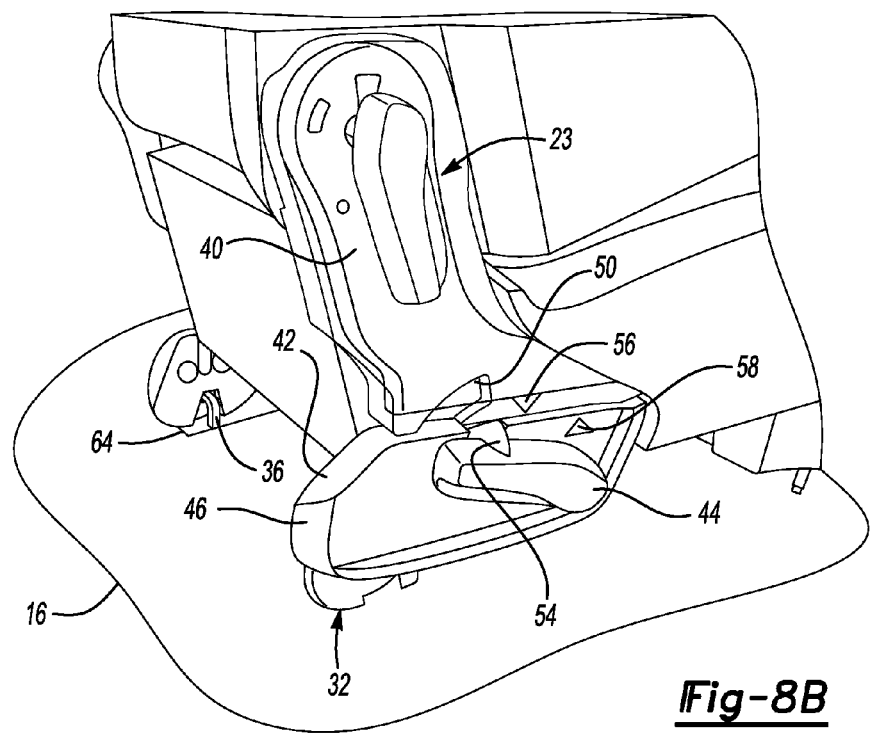

Referring now to FIG. 8B, seat structure 23 is adjusted relative to the latching mechanism 32 to move the seat structure 23 from the first position shown in FIG. 8A. It is contemplated that at least one indicia 56 may be provided on one or more of the first guide member 40 and second guide member 46 to identify when the first and second channel portions 50, 52 of channel 48 are placed in alignment. As shown in FIG. 8B, first indicia 56 on first guide member 40 is not in alignment with second indicia 58 on the second guide member 46.

If the first channel portion 50 and second channel portion 52 of channel 48 are in a locked position or out of alignment as is shown in FIG. 8B, the elongate projection 54 of the coupling element 44 cannot be adjusted out of the second channel portion 52 of channel 48. The elongate projection 54 may engage a portion of the first guide member 40, thereby limiting rotation of the coupling element 44 of the first actuator 42 such that the latching mechanism 32 continues to engage the at least one receiving portion 36.

In another embodiment of the disclosure, the first guide member 40 may include a stop extending longitudinally from an exterior surface of the first guide member 40 adjacent the second channel portion 52 of channel 48. The elongate projection 54 engages the stop to restrict movement of the elongate projection 54 and coupling element 44 of the first actuator 42 until the seat bottom 24 is positioned in the second position as will be described in greater detail below.

Figure 8C:
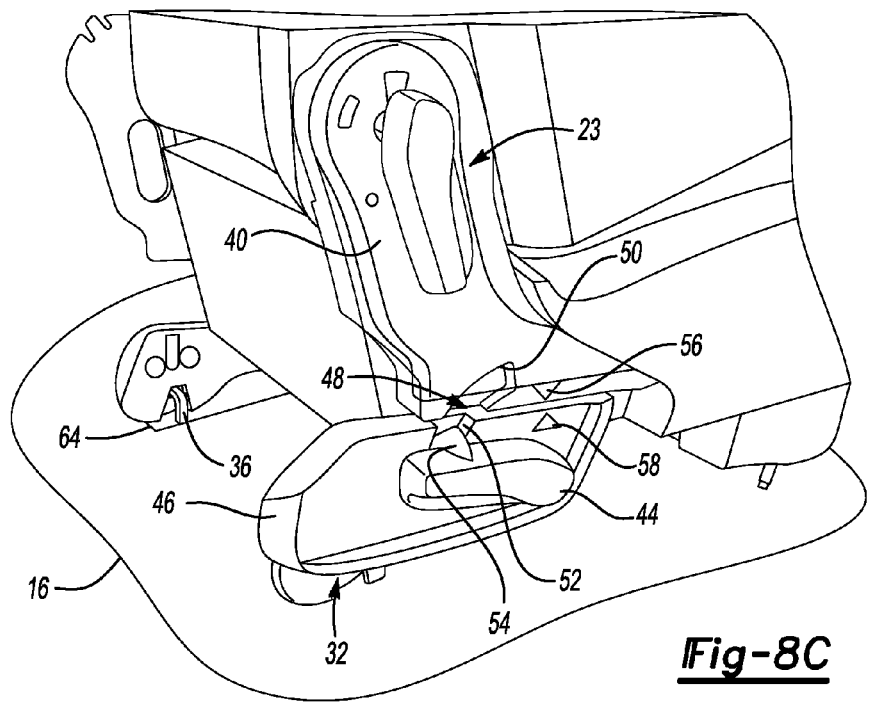
Figure 8D:
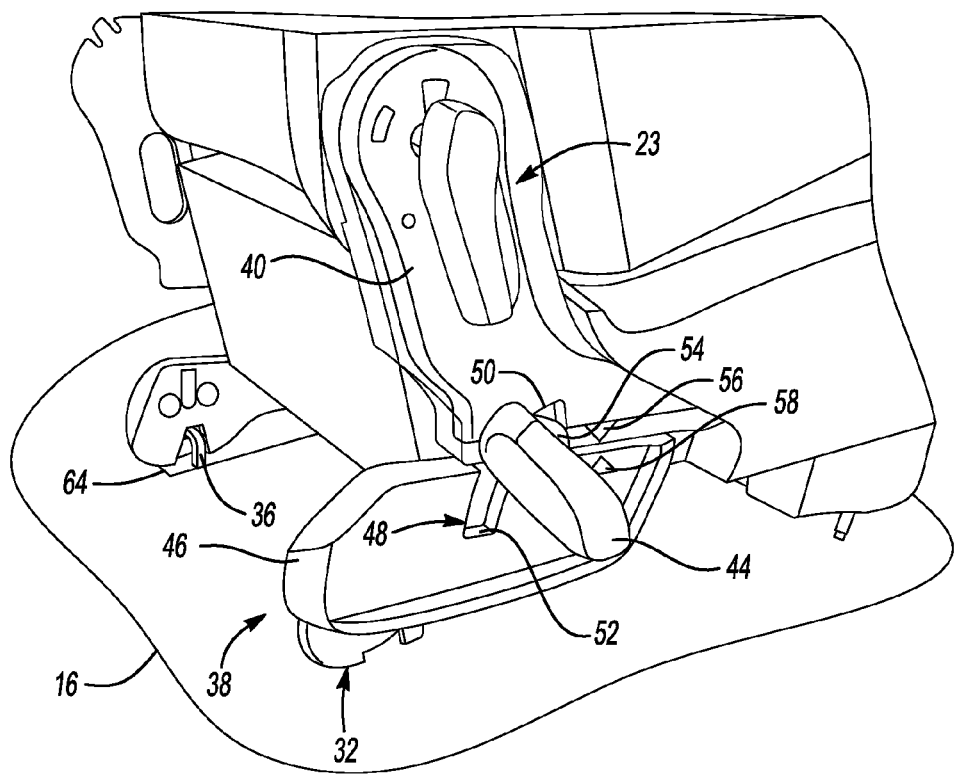

The seat structure 23 of seat 18 may be moved from the first or seated position to the second or stowed position illustrated in FIG. 6 and FIGS. 8C-8D through various well known arrangements. In one exemplary embodiment, seat structure 23 is translated or moved on the seat frame 20 relative to the latching mechanism 32 from the first position shown in FIGS. 8A and 8B such that the first channel portion 50 of the channel 48 on the first guide member 40 is placed in alignment or an unlocked position with the second channel portion 52 of the channel 48 on the second guide member 46.

Seat 18 may include at least one seat track arrangement cooperating with the seat frame 20 to translate the seat structure 23 forward relative to the latching mechanism 32. Seat track arrangement may be used to adjust the position of the seat bottom 24 along a longitudinal direction of the passenger compartment 12 of the vehicle 10. The at least one seat track arrangement for use with the disclosure shown in the Figures may include at least one track channel 64. The at least one track channel 64 is laterally spaced apart and parallel relative to one another. As provided in this disclosure, the at least one track channel 64 cooperates with the seat frame 20 to receive and operatively connect with at least one track mount that cooperates with or is fixed to the seat structure 23.

The seat frame 20 may be pivotally connected to a support structure 70 disposed on the vehicle floor 16 by hinges 72. Support structure 70 and hinges 72 may be disposed adjacent the first end 21 of the seat frame 20 of the seat 18. The at least one track mount may be laterally spaced apart and parallel relative to one another to slidably engage the at least one track channel 64 to position the seat structure 23 in a longitudinal direction relative to the vehicle floor 16 between at least the first position shown in FIG. 8A or 8B to the second position illustrated in FIGS. 8C and 8D.

A second actuator 74 may be provided adjacent the first end 21 of the seat frame 20 of the seat 18. Second actuator 74 selectively engages a release mechanism cooperating with the at least one track mount to selectively engage and disengage the at least one track channel 64 to secure the seat structure 23 in position on the at least one track channel 64. Second actuator 74 may be selectively disengaged such that the seat structure 23 may be translated forward relative to the latching mechanism 32 to align the first channel portion 50 of channel 48 on the first guide member 40 with the second channel portion 52 of channel 48 on the second guide member 46 as shown in FIG. 8C.

Referring to FIGS. 8C and 8D, the seat structure 23 is moved relative to the latching mechanism 32 such that the first guide member 40 and second guide member 46 are positioned to align the first and second channel portions 50, 52 of channel 48. Once aligned, the elongate projection 54 of the coupling element 44 of the first actuator 42 may be translated from the locked position in the second channel portion 52 of the channel 48 into the unlocked position wherein the coupling element 44 may be adjusted such that the elongate projection 54 may be positioned in the first channel portion 50 of channel 48.

Figure 4:
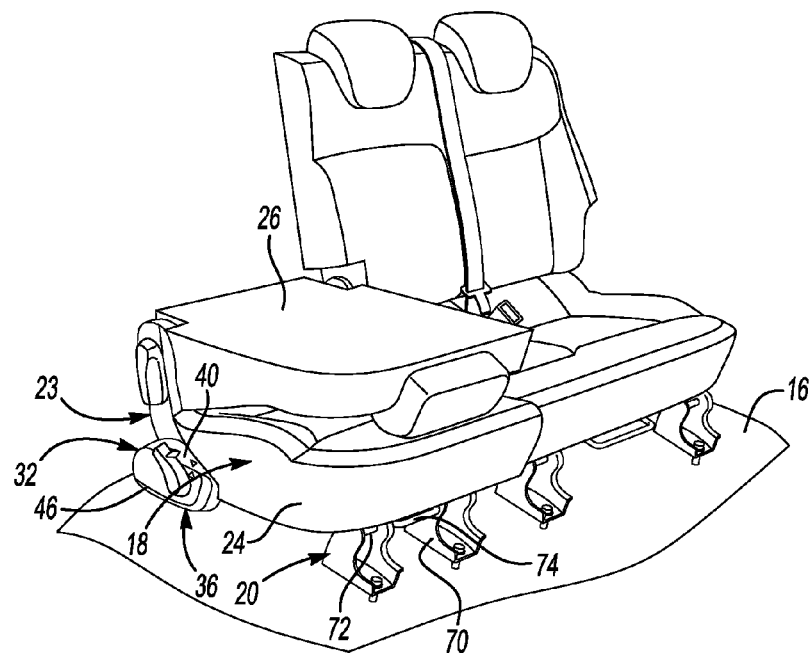
FIG. 4 is a perspective view of a seat bottom of the first seat assembly placed in an extended position prior to moving the first seat assembly to a third folding position.

As is shown in FIGS. 5 and 6, movement of the coupling element 44 and elongate projection 54 into the unlocked position in the first channel portion 50 of the channel 48 thereby causes latching mechanism 32 to disengage the at least one receiving portion 36. The disengagement of the latching mechanism 32 from the at least one receiving portion 36 releases the seat structure 23 from a position adjacent the vehicle floor 16 illustrated in FIG. 4 to the second or stowed position in FIGS. 5 and 6 such that the seat bottom 24 and seat back 26 of the seat structure 23 may pivot about support structure 70 and hinges 72. In the embodiment shown in FIG. 1, the first row of seats 14 may form a stop to limit the movement of the seat 18 placed in the stowed position to create an enlarged storage space in the passenger compartment 12.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A seat assembly for use in a vehicle comprising:
   a seat frame having a first end connected to a vehicle floor and a second end;
   a seat structure adjustably positionable between the first and second ends of the seat frame, the seat structure having a seat bottom and a seat back pivotally connected to the seat structure;

a latching system cooperating with the seat frame, the latching system having at least one receiving portion disposed on the vehicle floor and a latching mechanism disposed on the second end of the seat frame and adjacent the seat structure to releasably engage the at least one receiving portion; and a seat adjustment system operatively connected to the latching system for positioning the seat structure on the seat frame between at least one of an unlocked position and a locked position and to adjustably position the seat structure relative to the seat frame of the vehicle, the seat adjustment system including:

a first guide member disposed proximate to the seat structure, wherein the first guide member at least partially encloses a portion of the seat structure, a second guide member disposed proximate to the latching mechanism on the second end of the seat frame, wherein the second guide member at least partially encloses a portion of the latching mechanism, the first and second guide members defining a channel having a first channel portion at least partially formed in a portion of the first guide member and a second channel portion at least partially formed in a portion of the second guide member, a first actuator cooperating with the latching mechanism and operative to selectively latch and unlatch the latching mechanism to releasably secure the latching mechanism to the at least one receiving portion of the latching system, and a coupling element connected to the first actuator, the coupling element having an elongate projection extending from the coupling element that is at least partially received within and cooperating with the second channel portion, wherein the seat structure is adjusted on the seat frame to align the second channel portion on the second guide member with the first channel portion on the first guide member to move the elongate projection from a locked position wherein the elongate projection is disposed in the second channel portion to an unlocked position wherein the elongate projection is disposed in the first channel portion to release the latching mechanism from the at least one receiving portion.

2. The seat assembly of claim 1 further comprising at least one indicia provided on at least one of the first guide member and second guide member to indicate when the first channel portion and the second channel portion are in alignment.

3. The seat assembly of claim 2 wherein the at least one indicia further comprises at least one indicia provided on the first guide member and at least one indicia provided on the second guide member, wherein the at least one indicia on the first guide member is aligned with the at least one indicia on the second guide member when the seat structure is adjusted on the seat frame to align the second channel portion on the second guide member with the first channel portion on the first guide member.

4. The seat assembly of claim 1 wherein the seat structure includes at least one track mount operatively connected to at least one track channel on the seat frame to move the seat structure relative to the seat frame.

5. The seat assembly of claim 4 further comprising a second actuator selectively engaging a release mechanism cooperating with the at least one track mount to position the seat structure relative to the seat frame to the first channel portion on the first guide member with the second channel portion on the second guide member.

6. The seat assembly of claim 1 further comprising an adjustment mechanism for selectively adjusting the seat back relative to the seat bottom between a seated position and a folded position wherein the seat back is placed proximate the seat bottom.

7. The seat assembly of claim 1 wherein the first end of the seat frame is pivotally connected to a floor of the vehicle to adjust the seat frame between a first position wherein the seat frame is positioned proximate the vehicle floor and a second position wherein the seat frame pivots about the first end.

8. The seat assembly of claim 1 wherein the first guide member is secured to a portion of the latching mechanism.

9. The seat assembly of claim 1 wherein the second guide member is secured to a portion of the seat structure.

10. A seat assembly for use in a vehicle passenger compartment comprising:

a seat frame having a first end pivotally connected to the passenger compartment and a second end;

a seat structure adjustably positionable between the first and second ends of the seat frame, the seat structure having a seat bottom and a seat back pivotally connected to the seat structure;

an adjustment mechanism selectively adjusting the seat back relative to the seat bottom between a seating position and a folded position wherein the seat back is placed proximate the seat bottom;

a latching system cooperating with the seat frame, the latching system having at least one receiving portion disposed on the vehicle passenger compartment and a latching mechanism disposed on the second end of the seat frame and adjacent the seat structure to releasably engage the at least one receiving portion; and a seat adjustment system operatively connected to the latching system for positioning the seat structure on the seat frame between at least one of an unlocked position and a locked position and to adjustably position the seat structure relative to the seat frame of the vehicle, the seat adjustment system including:

a first guide member disposed proximate to the seat structure, wherein the first guide member at least partially encloses a portion of the seat structure, a second guide member disposed proximate to the latching mechanism on the second end of the seat frame, wherein the second guide member at least partially encloses a portion of the latching mechanism, the first and second guide members defining a channel having a first channel portion at least partially formed in a portion of the first guide member and a second channel portion at least partially formed in a portion of the second guide member, at least one indicia provided on at least one of the first guide member and second guide member, a first actuator cooperating with the latching mechanism and operative to selectively latch and unlatch the latching mechanism to releasably secure the latching mechanism to the at least one receiving portion of the latching system, and a coupling element connected to the first actuator, the coupling element having an elongate projection extending from the coupling element that is at least partially received within and cooperating with the second channel portion, wherein the seat structure is adjusted on the seat frame to align the second channel portion on the second guide member with the first channel portion on the first guide member to move the elongate projection from a locked position wherein the elongate projection is disposed in the second channel portion to an unlocked position wherein the elongate projection is disposed in the first channel portion to release the latching mechanism from the at least one receiving portion.

11. The seat assembly of claim 10 wherein the at least one indicia further comprises at least one indicia provided on the first guide member and at least one indicia provided on the second guide member, wherein the at least one indicia on the first guide member is aligned with the at least one indicia provided on the second guide member to indicate alignment of the first channel portion and the second channel portion.

12. The seat assembly of claim 10 wherein the seat structure includes at least one track mount operatively connected to at least one track channel on the seat frame to move the seat structure relative to the seat frame.

13. The seat assembly of claim 12 further comprising a second actuator selectively engaging a release mechanism cooperating with the at least one track mount to position the seat structure relative to the seat frame to the first channel portion on the first guide member with the second channel portion on the second guide member.

14. The seat assembly of claim 10 wherein the seat frame is adjustable between a first position wherein the seat frame is positioned proximate the passenger compartment and a second position wherein the seat frame pivots about the first end.

15. The seat assembly of claim 10 wherein the first guide member is secured to a portion of the latching mechanism.

16. The seat assembly of claim 10 wherein the second guide member is secured to a portion of the seat structure.

17. An adjustment system for a vehicle seat including a seat frame having a first end connected to a vehicle floor, a second end and a seat structure to position the vehicle seat relative to the vehicle comprising:
  a latching system having at least one receiving portion disposed on the vehicle floor and a latching mechanism disposed on the second end of the seat frame and adjacent the seat structure to releasably engage the at least one receiving portion;
  a first guide member disposed proximate to the seat to the seat structure, wherein the first guide member at least partially encloses a portion of the seat structure,
  a second guide member having a second channel portion configured to align with the first channel portion;
  a second guide member disposed proximate to the seat back and positioned adjacent the first guide member and the latching mechanism on the second end of the seat structure;
  a second guide member disposed proximate to the latching mechanism on the second end of the seat frame, wherein the second guide member at least partially encloses a portion of the latching mechanism;
  the first and second guide members defining a channel having a first channel portion at least partially formed in a portion of the first guide member and a second channel portion at least partially formed in a portion of the second guide member;
  a first actuator cooperating with the latching mechanism and operative to selectively latch and unlatch the latching mechanism to releasably secure the latching mechanism to the at least one receiving portion of the latching system;
  a coupling element connected to the first actuator, the coupling element having an elongate projection extending from the coupling element that is at least partially received within and cooperating with the second channel portion,
  wherein the seat structure is adjusted on the seat frame to align the second channel portion on the second guide member with the first channel portion on the first guide member to move the elongate projection from a locked position wherein the elongate projection is disposed in the second channel portion to an unlocked position wherein the elongate projection is disposed in the first channel portion to release the latching mechanism from the at least one receiving portion.

18. The seat adjustment system of claim 17 wherein the at least one indicia further comprises at least one indicia provided on the first guide member and at least one indicia provided on the second guide member, wherein the at least one indicia on the first guide member is aligned with the at least one indicia provided on the second guide member when the first channel portion is aligned with the second channel portion.

19. The seat adjustment system of claim 17 wherein the first guide member is secured to a portion of the latching mechanism.

20. The seat adjustment system of claim 17 wherein the second guide member is secured to a portion of a seat structure of the vehicle seat.

* * * * *